United States Patent [19]

Bender et al.

[11] Patent Number: 5,028,001

[45] Date of Patent: Jul. 2, 1991

[54] METHOD OF VIBRATION ISOLATING AN AIRCRAFT ENGINE

[75] Inventors: Stanley I. Bender; Lawrence Butler, both of Cincinnati; Peter W. Dawes, Madeira, all of Ohio

[73] Assignee: General Electric Company, Cincinnati, Ohio

[21] Appl. No.: 386,843

[22] Filed: Jul. 31, 1989

Related U.S. Application Data

[62] Division of Ser. No. 25,541, Mar. 13, 1987, Pat. No. 4,875,655.

[51] Int. Cl.$^5$ ............................................. B64D 27/10
[52] U.S. Cl. ...................................... 244/54; 248/557
[58] Field of Search .......................... 244/53 R, 54, 55; 248/554–557, 614, 638, 603–607, 562; 60/262, 39.31; 29/434

[56] References Cited

U.S. PATENT DOCUMENTS

| | | | |
|---|---|---|---|
| 2,241,408 | 5/1941 | Lord | 248/556 |
| 2,270,673 | 1/1942 | Lord | 248/556 |
| 2,310,882 | 2/1943 | Taylor | 248/614 |
| 2,332,264 | 10/1943 | Saurel | 248/605 |
| 2,365,421 | 12/1944 | Lord | 244/54 |
| 2,420,452 | 5/1947 | Strachovsky | 244/54 |
| 2,753,140 | 7/1956 | Hasbrouch et al. | 244/54 |
| 3,006,587 | 10/1961 | Jumelle et al. | 248/554 |
| 3,056,569 | 10/1962 | Bligard | 244/54 |
| 3,085,773 | 4/1963 | Anstrom et al. | 248/555 |
| 3,201,069 | 8/1965 | Huskin | 244/54 |
| 3,222,017 | 12/1965 | Bobo | 244/54 |
| 3,288,404 | 11/1966 | Schmidt et al. | 248/557 |
| 3,464,657 | 9/1969 | Bullard | 248/638 |
| 3,675,418 | 7/1972 | Lerkeut et al. | 248/554 |
| 3,727,862 | 4/1973 | Kaufhold et al. | 248/554 |
| 3,831,888 | 8/1974 | Baker et al. | 248/554 |
| 3,836,100 | 9/1974 | Van Hardenberg | 244/54 |
| 3,848,832 | 11/1974 | Stanley et al. | 244/54 |
| 4,044,973 | 8/1977 | Moorehead | 244/54 |
| 4,213,585 | 7/1980 | Murphy | 244/54 |
| 4,403,762 | 8/1983 | Cogswell II, et al. | 248/659 |
| 4,441,313 | 4/1984 | Joubert et al. | 60/262 |

FOREIGN PATENT DOCUMENTS

| | | |
|---|---|---|
| 184022 | 3/1963 | Sweden . |
| 798832 | 7/1958 | United Kingdom . |
| 1053209 | 12/1966 | United Kingdom . |
| 1103509 | 2/1968 | United Kingdom . |
| 1467468 | 3/1977 | United Kingdom . |
| 2010969 | 7/1979 | United Kingdom . |
| 2049817 | 12/1980 | United Kingdom . |

Primary Examiner—Galen Barefoot
Attorney, Agent, or Firm—Jerome C. Squillaro

[57] ABSTRACT

A method for coupling an engine to a support frame for mounting to a fuselage of an aircraft using a three point vibration isolating mounting system in which the load reactive forces at each mounting point are statically and dynamically determined. A first vibration isolating mount pivotably couples a first end of an elongated support beam to a stator portion of an engine with the pivoting action of the vibration mount being oriented such that it is pivotable about a line parallel to a center line of the engine. An aft end of the supporting frame is coupled to the engine through an additional pair of vibration isolating mounts with the mounts being oriented such that they are pivotable about a circumference of the engine. The aft mounts are symmetrically spaced to each side of the supporting frame by 45 degrees. The relative orientation between the front mount and the pair of rear mounts is such that only the rear mounts provide load reactive forces parallel to the engine center line, in support of the engine to the aircraft against thrust forces. The forward mount is oriented so as to provide only radial forces to the engine and some lifting forces to maintain the engine in position adjacent a fuselage. Since each mount is connected to provide specific forces to support the engine, forces required of each mount are statically and dynamically determinable.

2 Claims, 4 Drawing Sheets

METHOD OF VIBRATION ISOLATING AN AIRCRAFT ENGINE

The invention herein described was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 07/025,541, filed Mar. 13, 1987 now U.S. Pat. No. 4,875,655.

FIELD OF THE INVENTION

This invention relates generally to gas turbine engine suspension systems and, more particularly, to vibration isolating suspension systems for an unducted type gas turbine engine.

BACKGROUND OF THE INVENTION

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which in turn drives the compressor. Many engines further include a second turbine, known as a power turbine, located aft of the gas generator and which extracts energy from the gas stream to drive propulsor blades. Such engines may be, for example, ducted turbofan engines and turboprop engines. Vibration isolators have been used with these engines to attenuate vibrations from the rotating propulsors and transitory shock due to maneuvering of an aircraft powered by the engines.

A recent improvement over the turbofan and turboprop engines described above is the unducted fan engine such as disclosed in U.S. Pat. application Ser. No. 437,923-Johnson, filed Nov. 1, 1982. In the unducted fan engine, the power turbine includes counter rotating rotors and turbine blades which drive counter rotating unducted propulsor or fan blades radially located with respect to the power turbine. As with any turbofan engines, there is a remote possibility that an unducted fan blade may be damaged or even lost if struck by an object such as a large bird or debris. A lost or damaged fan blade will result in an extreme imbalance condition and cause severe vibration of the engine.

The vibration potential of blade damage in these engines have required the development of mounting arrangements which can withstand vibration and prevent an engine from being torn loose from an aircraft by the vibrations. An example of a mounting arrangement for a turbofan engine is shown in U.S. Pat. No. 3,056,569 to Bligard which illustrates a two-plane mounting arrangement for attenuating ordinary vibration to the engine as well as some transitory vibration caused by maneuvering of the plane. The mounting arrangement employs two side mounts positioned on opposite sides of the engine and two top mounts. One of the top mounts is positioned in a common axial plane with the two side mounts. The mounts are arranged to provide their greatest restraint against forces which act in a direction along the main axis of each mount.

It is believed that one disadvantage of such prior art engine mounts is that they are dynamically indeterminate, i.e., under any given stress condition, it cannot be determined which mount will support the major portion of the stress. Additionally, any thermal expansion of the engine will vary and create stresses in the mounts. It is believed that another disadvantage of the prior art mounts is their inability to dampen vibrations in more than one direction. Thus, forces acting on a mount in a direction other than its main axis may result in a transfer of vibration to the aircraft itself.

SUMMARY OF THE INVENTION

Among the objects of the present invention is the provision of an improved engine suspension system for attenuating vibration in a gas turbine engine which overcomes the above discussed disadvantages, as well as others, of the prior art. It is another object of the present invention to provide a vibration isolation system which is statically and dynamically determinate. In one embodiment, the present invention is directed to an aircraft engine suspension system for mounting a gas turbine engine to a supporting frame by mounts arranged in first and second parallel, spaced axial mounting planes of the engine. First and second vibration isolation mounts are aligned in the first mounting plane and couple the engine to the supporting frame. Each of the first and second mounts provides both radial and axial vibration damping to the engine as well as radial and axial stiffness. A third vibration isolation mount is aligned in the second mounting plane and couples the engine and support frame together to provide radial and tangential vibration damping to the engine as well as radial and tangential stiffness. The mounts are arranged axially and radially such that the suspension system is statically and dynamically determinate.

BRIEF DESCRIPTION OF THE DRAWINGS

The present invention is illustrated by way of examples in the accompanying drawings in which.

DETAILED DESCRIPTION OF THE PREFERRED EMBODIMENTS

Figure 1:
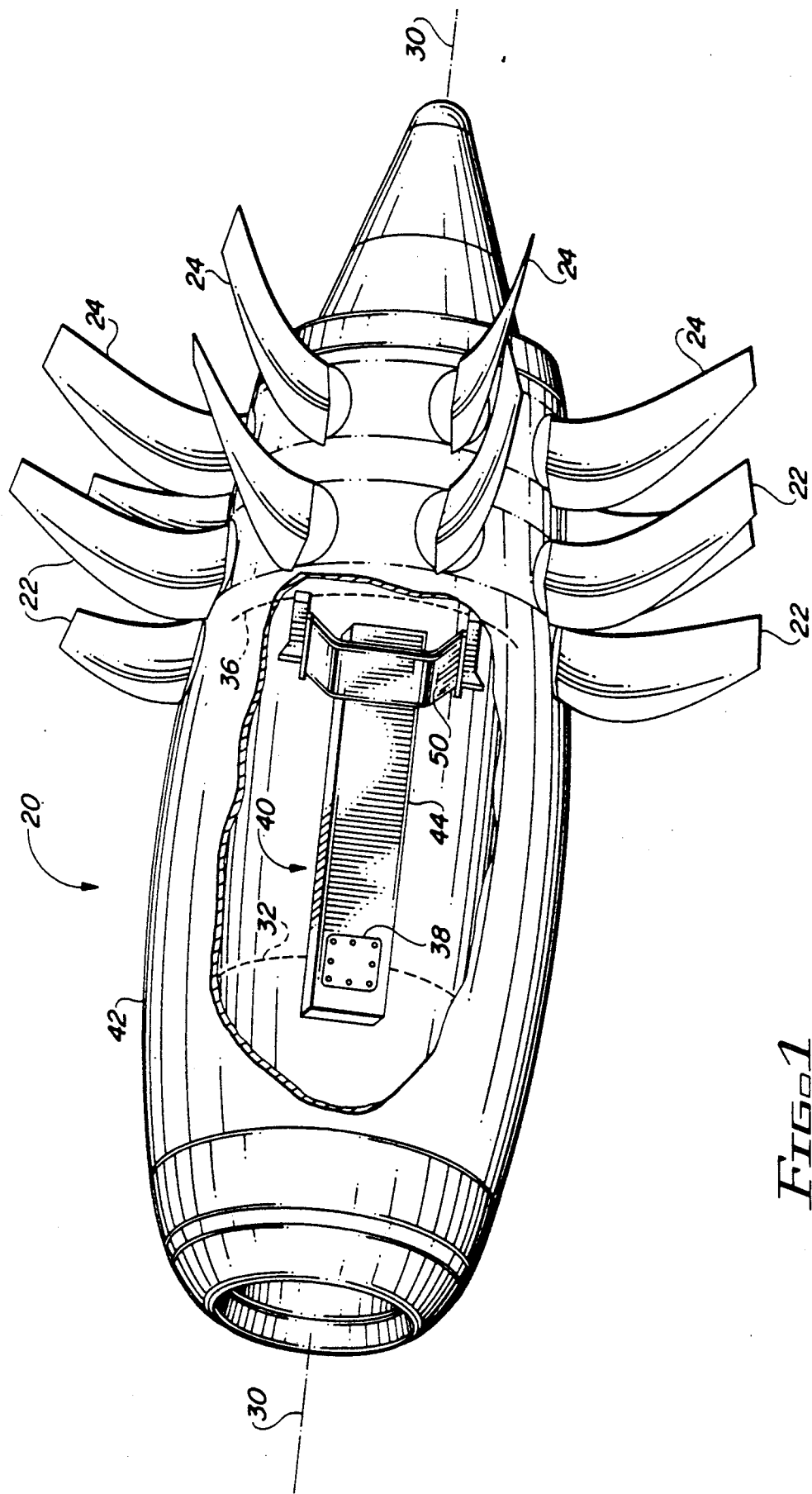
FIG. 1 illustrates a perspective view with a partial cutaway of an unducted fan type gas-turbine engine incorporating the inventive mounting arrangement.
Figure 2:
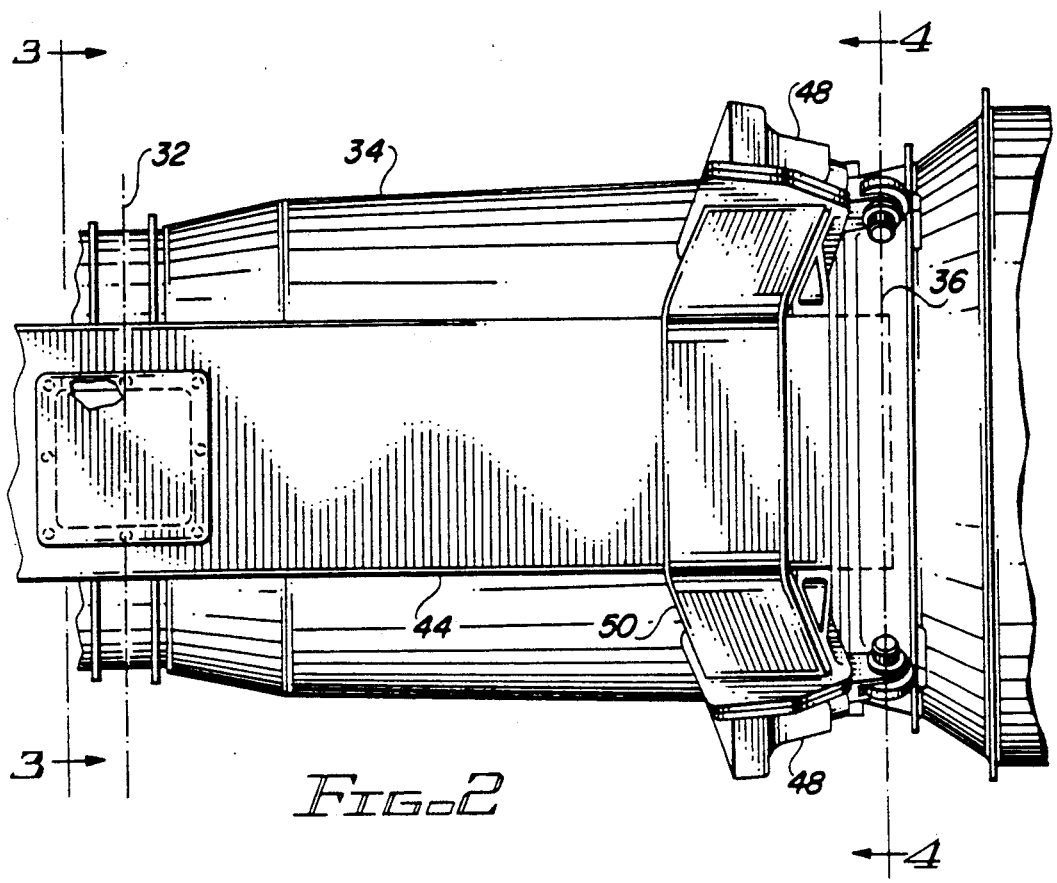
FIG. 2 illustrates an enlarged side elevational view of the mounting arrangement shown in FIG. 1.

Referring first to FIGS. 1-2, there is illustrated an unducted fan (UDF) gas turbine engine 20 having forward and aft counter rotating propulsor blades 22 and 24 disposed radially outwardly of a power turbine section of the engine 20. The power turbine section is disclosed in the aforementioned Johnson patent application. The turbine section essentially includes counter rotating rotors (not shown) and counter rotating turbine blades (not shown) coupled to the rotors. The forward and aft blades 22 and 24 are coupled to corresponding ones of the rotors and are rotatably driven thereby. A vibration isolating suspension system 40 (the "mounting arrangement") is coupled to a nonrotating portion 34 of the engine 20 (the "stator portion") forward of the propulsor blades 22 and 24. The functions and objects of the suspension system 40 will be discussed in greater detail below. The engine 20 further includes an outer shroud or nacelle 42, a portion of which has been shown as cutaway so as to enable viewing of the suspension system 40 in FIG. 1. The nacelle 42 provides proper airflow characteristics to optimize the performance of the propulsor blades 22 and 24.

With reference to FIGS. 1-6 in general, there is illustrated in one form of the invention a vibration isolating suspension system 40. The suspension system 40 includes a supporting frame 44 and a plurality of mounts arranged in first and second parallel spaced mounting planes indicated at 32 and 36 transverse to a longitudinal axis or centerline 30 of the engine 20. The axis 30 is along the centerline of the engine 20 in a direction of thrust. Although not shown, it is to be understood that the supporting frame 44 is adapted to be rigidly secured to an aircraft through a pylon (not shown) in a manner well known in the art. Located within the first mounting plane 32 (forward mounting plane) is a forward isolation mount 46 which provides radial and tangential (i.e., along a tangent line to the circumference of stator portion 34) stiffness and damping between the engine stator portion 34 and the supporting frame 44. A cover plate 38 in frame 44 provides access to mount 46. Two aft isolation mounts 48 are located in the second mounting plane 36 (the rear mounting plane) and provide radial and axial damping as well as radial and axial stiffness between the stator portion 34 and the supporting frame 44. The aft mounts 48 are supported on a structural cross-member 50 attached to an aft portion of frame 44. With this mounting arrangement, all of the thrust loads along axis 30, i.e., axial forces, are carried by the aft isolation mounts 48. The forward isolation mount 46 is pinned to the stator portion 34 and to the supporting frame 44 as will be described more fully hereinafter so as not to transfer any axial forces from the engine to the supporting frame 44. Since no axial forces are transferred through the forward isolation mount 46, thermal expansion in the axial direction of the engine 20 will not result in an increase in thermal stresses.

Figure 3:
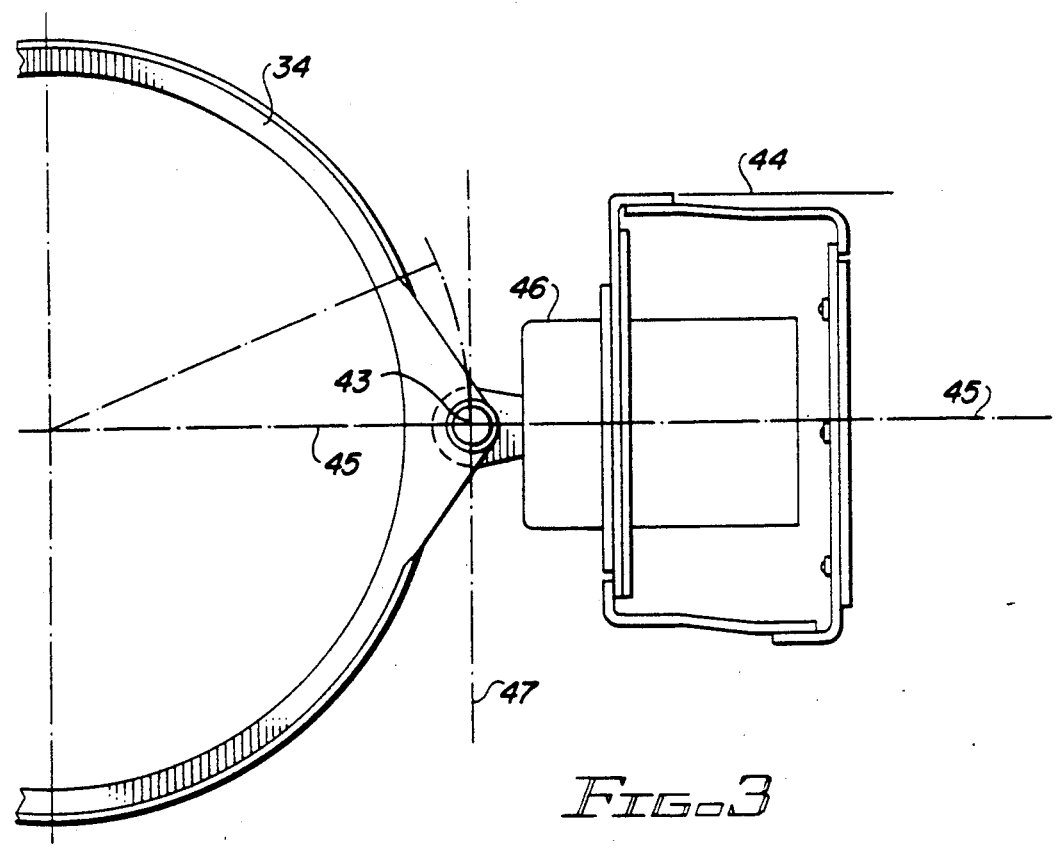
FIG. 3 is a partial front section view taken along the line 3—3 of FIG. 2 illustrating a front mount arrangement.

FIG. 3 is a partial cross-sectional view taken along the line 3—3 of FIG. 2 illustrating the coupling between stator portion 34 and forward mount 46 and between frame 44 and mount 46. A pin 43 pivotably attaches mount 46 to stator portion 34 to permit limited pivoting in the mounting plane 32. Since the pin 43 has its axis oriented parallel to engine centerline 30, the mount 46 does not exert a restraining force along the engine centerline. Rather, mount 46 limits deflection of stator portion 34 in a radial direction, i.e., in the direction indicated by extended radius line 45. Deflections are also restrained tangentially, i.e., along the line 47 parallel to a tangent line of the circumference of stator portion 34.

Figure 4:
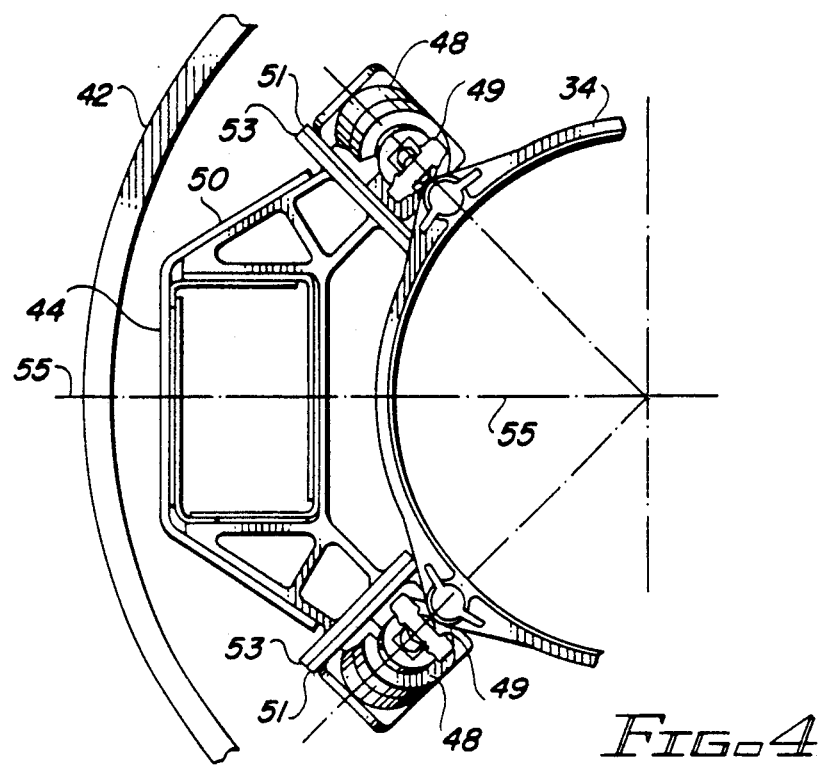
FIG. 4 is a partial perspective view taken along the line 4—4 of FIG. 2 illustrating an aft engine mounting arrangement.

FIG. 4 is a partial cross-section, partial perspective view taken along line 4—4 looking toward the forward portion of engine 20. The mounts 48 can be seen coupled to stator portion 48 through pivoting joints 49. Each mount 48 includes a side flange 51 which abuts and is attached to a corresponding flange 53 on the ends of cross-member 50. The member 50 is constructed so that the mounts 48 are 90 degrees apart about the circumference of stator portion 34. Furthermore, the mounts 48 are symmetrically positioned with respect to frame 44, being at ±45 degrees with respect to an engine radius line 55 extending through a center of frame 44. Although the angular spacing between the two mounts 48 could be other than 90 degrees, it is desireable to avoid angular orientations in which the resolved vector forces are aligned, i.e., 180 degree displacement is not acceptable since the radial vectors align and the forces exerted by each mount become indeterminant. Angular displacement of 90 degrees is ideal since the radial vectors are then perpendicular and thus de-coupled.

It should be noted that the mounts 48 are canted or inclined with respect to the centerline 30 of engine 20. Two functions are achieved by the canting. First, as will become apparent in the description to follow of FIGS. 5-6, the mounts 48 have their greatest capability in a direction through their central axis (shown at 66 in FIGS. 5-6) and that axis is more aligned with centerline 30 by such canting. Secondly, canting reduces the space required between stator portion 34 and nacelle 42 for containing the mounts.

Figure 7:
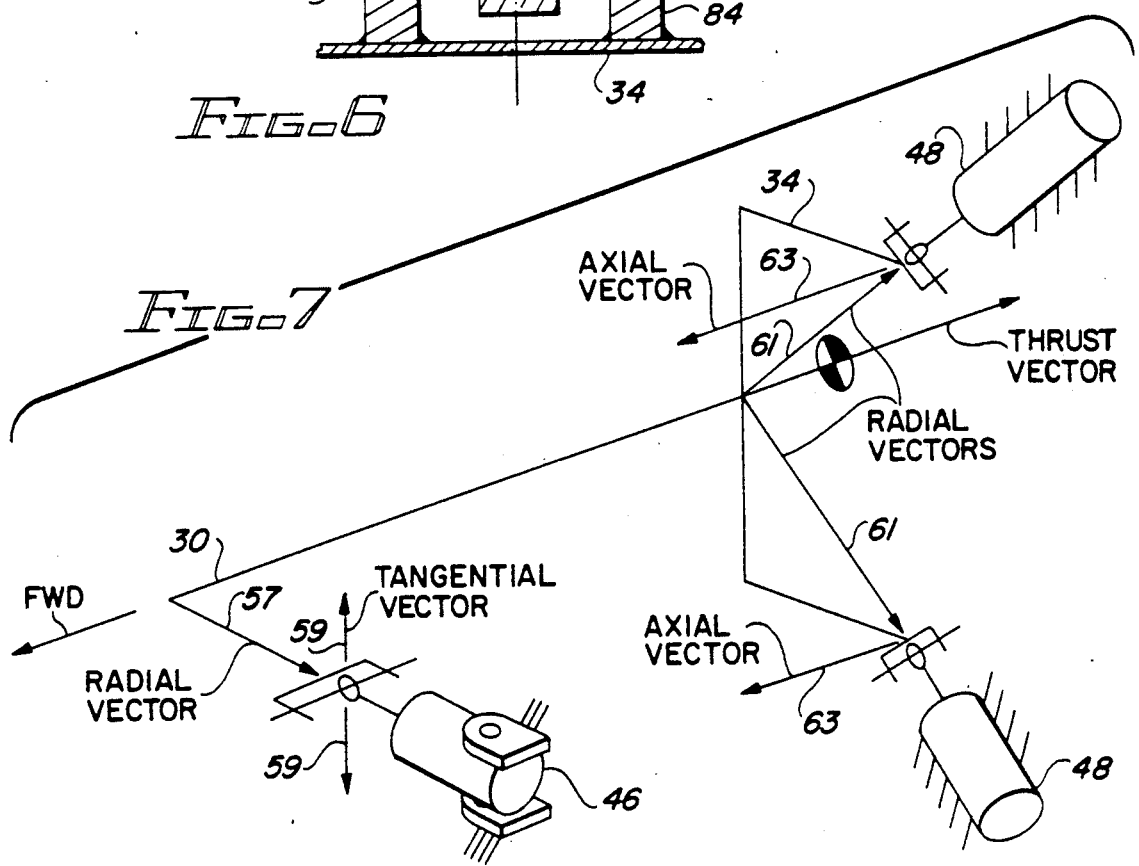
FIG. 7 illustrates load force distribution acting on the engine mounting arrangement.

Before turning to a description of the vibration isolating mounts 46 and 48, reference is made to FIG. 7 in which the mounts and resultant forces are schematically illustrated. Because of the manner in which the mounts are positioned and hinged, the forces exerted by each are statically and dynamically determinable. Assuming that the engine 20 is mounted via a pylon to a side of a fuselage of an aircraft, e.g., in the manner of mounting of turbofan engines to a Boeing 727 aircraft, which is flying level and thus horizontally stabilized, the mount 46 exerts a horizontal force vector or radial vector 57 tending to pull or push the engine 20 in a horizontal plane with respect to the aircraft. Additionally, the mount 46 exerts a vertical force vector or tangential vector 59 supporting the engine vertically. However, the hinge connection limits the ability of mount 46 to exert any force parallel to centerline 30 of engine 20.

At the aft connections, the mounts 48 exert radial forces indicated by lines 61 which restrain the engine 20 in the horizontal plane and thus assist mount 46 in supporting the engine 20 to the aircraft. Additionally, the mounts 48 exert an axial force (force vectors 63) parallel to the engine centerline 30 (and thus parallel to a thrust direction) and provide for the transfer of thrust from engine 20 to the attached aircraft. However, the hinge connections are such that less force is exerted along tangent lines to stator portion 34. Accordingly, each mount 46 and 48 is designed and positioned to counter-act forces in known directions. Therefore, the forces acting on each mount are statically and dynamically determinable. More specifically, each of the three vibration isolating mounts 46 and 48 establish two 90 degree oriented force vectors at the mount-to-engine interface. As will become apparent from the description of FIGS. 5-6, the stiffness represented by each load or force vector is provided by separate elements within each isolating mount, which elements need not interact, so that the stiffness and vibration damping characteristics of each mount can be tuned specifically to meet desired analytical and/or experimentally established requirements. The stiffness characteristics of the elements within the mounts 46 and 48 are such that vibration damping is an inherent characteristic. However, the mounts 46 and 48 may be designed to provide specific damping characteristics by selection of the material of the elements and the size and/or shape of the elements. Additionally, other external vibration damping devices (not shown) of a type well known in the art may be coupled to the engine 20 to supplement the damping provided by mounts 46 and 48.

It should also be noted that the attachment of the mounts 46 and 48 to the engine 20 is through a pin and clevis arrangement which establishes only simple forces on the pin in double shear. No other interface loads and no additional moments are applied to the engine. The isolating mounts 46 and 48 may be oriented along either of the load vectors shown in FIG. 7. Such orientation will depend on the design of the support structure, i.e., the frame 44 and the structure of stator portion 34, and the required stiffness for each individual load vector. The arrangement shown in FIGS. 1-4 and 7 is essentially a radial orientation for all three mounts. By positioning the aft mounts 48 more in line with the axially aligned load vectors 63, the mounts can be established in an axial orientation. So long as the positioning is such that the forces exerted by each mount can be identified, the system will remain statically and dynamically determinant.

Figure 5:
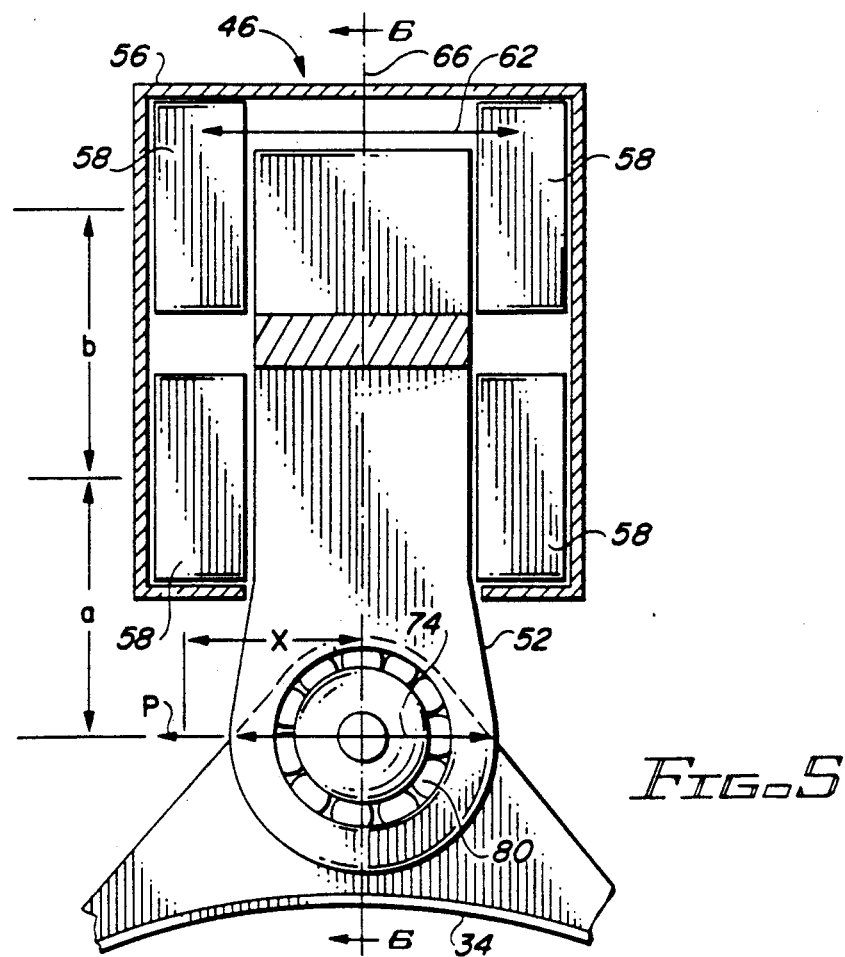
FIG. 5 is a cross-sectional view of an exemplary mount.
Figure 6:
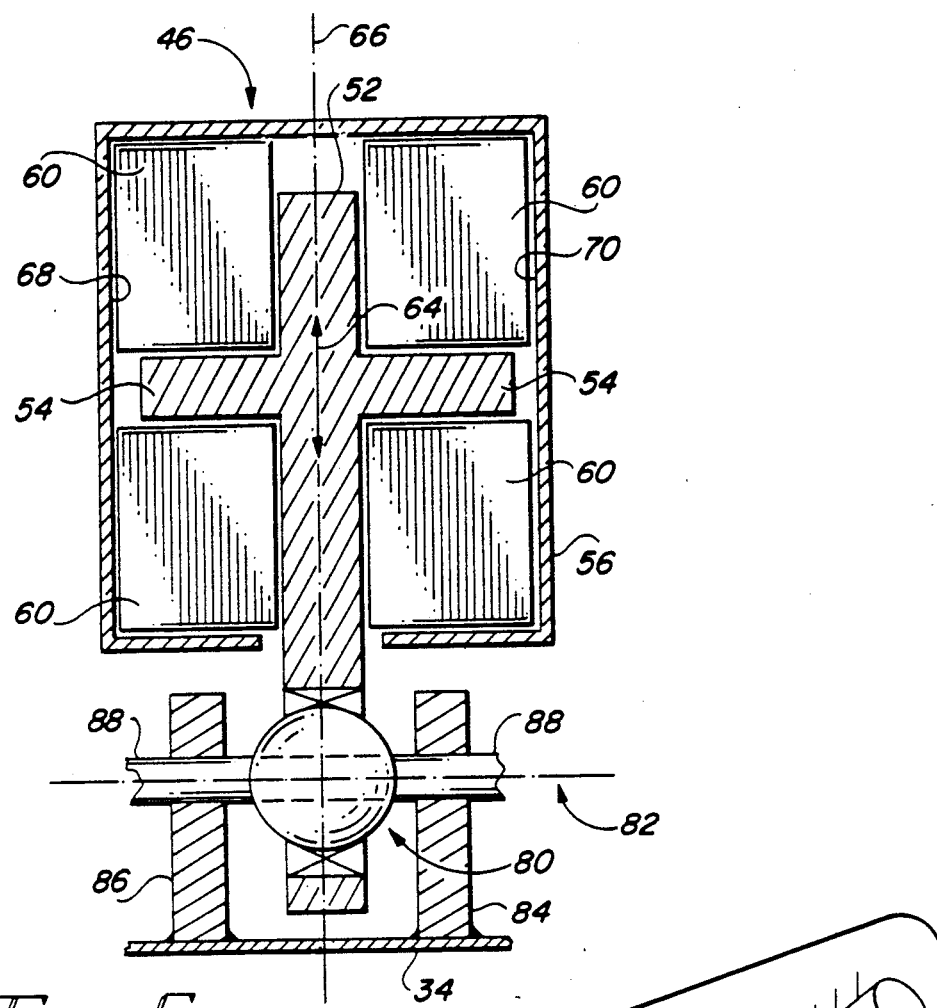
FIG. 6 is a cross-sectional view of the mount of FIG. 5 rotated 90 degrees.

Turning now to FIGS. 5 and 6, there are shown two cross-sectional views of the isolation mount 46, each taken at 90 degrees with respect to the other. FIG. 5 is a view looking aft of the engine 20 along centerline axis 30 while FIG. 6 views the mount 46 in the direction indicated by the section line 6—6. The mount 46 includes a central shaft 52 formed of steel or other suitably strong material. A pair of oppositely directed arms or flanges 54 extend from the shaft 52 such that the shaft has a cross-shape (best seen in FIG. 6). Shaft 52 is positioned within a supporting casing 56, which casing is constructed of a metal alloy suitable for attaching the mount 46 to the support frame 44 which is shown on FIG. 4. Within the casing 56 are a plurality of resilient elements 58 and 60. The resilient elements may be formed of rubber or other material having suitable stiffness to effect vibration damping while providing limited and controlled deflection. The elements 58 provide resistance (stiffness) and vibration damping in the transverse direction indicated by double headed line 62 from forces 74 imposed by stator 34. The elements 60 provide stiffness and vibration damping in the direction parallel to an axis 66 through mount 46 indicated by double headed line 64.

The elements 58 react against the inner sides of casing 56. The elements 60 react against upper and lower surfaces or faces, as seen in FIG. 6, of flanges 54 and against the upper and lower inner surfaces of casing 56.

The connection between shaft 52 and stator portion 34 is preferrably through a pivotable joint and for this purpose one type of suitable connection is by use of a uniball-type pivoting connection 80 of a type well known in the art. The uniball connection 80 permits some misalingment or angular displacement of shaft 52 with respect to an axis 82 through an axial center of uniball connection 80 without causing the pivotable joint to bind. It should also be noted that uniball connection 80 is pivotably mounted to stator 34 to allow the axis of shaft 52 to be angularly varied with respect to the engine axis or centerline 30. Such connection is made through a pair of clevises 84 and 86 extending from stator portion 34 and having apertures for receiving the pin 88 of uniball connection 80.

From the above description, it will be appreciated that each isolation mount 46 and 48 provides damping and stiffness in only two primary directions, i.e., in a direction 64 parallel to the longitudinal axis 66 of the shaft 52 and in a direction 74 transverse to the shaft 52. Thus, each isolation mount 46 has two primary support vectors which are perpendicular to each other.

The forces acting transversely of the longitudinal axis 66 of the shaft 52 are described below with reference to FIG. 5. When the shaft 52 is subject to a transverse force P, the distance the shaft is deflected depends on the transverse stiffness of the isolation mount 46. The distance which the shaft 52 will be deflected is given by the equation:

$$x = P/K_t,$$

where x is the transverse distance which the shaft is deflected, and $K_t$ is the transverse stiffness of the isolation mount 46. Consider the stiffness/damping elements to be rubber for this example; other suitable materials may be used. Assuming each of the rubber elements 58 have equal stiffness constants and ignoring any bending and shear deflection in the shaft 52, the transverse stiffness $K_t$ can be calculated by the equation:

$$K_t = P/x = \frac{K_1}{1 + 2a/b + 2(a/b)^2}$$

where $K_1$ is the stiffness constant for each of the rubber elements 58, a is the distance between the axis 82 and a centerline through the lower rubber elements 58, and b is the distance between the centerline of the lower rubber elements 58 and a centerline through the upper rubber elements 58. Typically, this distance constant for the rubber elements 58 is selected so that the isolation mount 46 will have a specific transverse stiffness $K_t$. Thus, the stiffness constant $K_1$ may be calculated by the equation:

$$K_1 = K_t[1 + 2a/b + 2(a/b)^2].$$

Referring again to FIG. 6, the stiffness of the isolation mount 46 in the direction of axis 66 is equal to the sum of the stiffness constants for each of the rubber elements 60 which are acted on by the flange 54. As shown, two of the rubber elements 60 are positioned above the flange 54 and two are positioned below the flange 54. When the shaft 52 and flange 54 are displaced axially down with the stator 34, the two rubber elements 60 positioned below the flange 54 are in compression. Consequently, assuming each of the rubber elements 60 have the same stiffness constants, the axial stiffness of the isolation mount 46 is twice as large as the spring constant of each of the rubber elements 60. Likewise, if the stator 34 and shaft 50 are displaced axially upward, the rubber elements 60 positioned above the flange 54 will be in compression and the stiffness of the isolation mount 46 will be twice the stiffness of each of the rubber elements 60.

It is to be understood that the transverse stiffness and axial stiffness of the isolation mount 46 may be independently chosen to match the specific characteristics of the engine with which they are used by providing rubber or other resilient elements having appropriate stiffness constants. Furthermore, while elements 58 and 60 have been shown and described as individual sections, an alternate arrangement is to replace the elements 58 and 60 with a pair of resilient toroidal (doughnut-shaped) elements, one above and one below the flange 54.

While the principles of the invention have now been made clear in an illustrative embodiment, there will become obvious to those skilled in the art many modifications in structure, arrangement, portions and components useful in the practice of the invention which are particularly adapted for specific operating requirements without departing from those principles. Accordingly, it is intended that the description be interpreted as illustrative and not in a limiting sense and that the invention be given a scope commensurate with the appended claims.

We claim:

1. A method for coupling an elongated support frame to an aircraft engine such that load forces transmitted to the frame from each of a plurality of coupling points on the engine are statically and dynamically determinant, said method comprising the steps of:

pivotably coupling a first end of the frame to the engine by means of a first vibration damping mount;

orienting the first mount such that it is pivotable about a line parallel to a centerline of the engine;

pivotably coupling a second end of the frame to the engine by means of second and third vibration damping mounts, the second and third mounts being symmetrically spaced to each side of the frame in a mounting plane transverse to a centerline of the engine; and orienting each of the second and third mounts such that it is pivotable about a circumference of the engine, the relative orientation of the first mount to the second and third mounts being such that only the second end mounts provide load reactive forces parallel to the engine centerline.

2. The method of claim 1 wherein the second mounts are angularly spaced apart by approximately 90 degrees.

* * * * *